May 28, 1935.　　　　R. E. SPURR　　　　2,002,967
GRINDING APPARATUS
Filed July 3, 1933　　　5 Sheets-Sheet 1

INVENTOR.
ROBERT EDWIN SPURR.
BY
ATTORNEYS.

May 28, 1935.  R. E. SPURR  2,002,967
GRINDING APPARATUS
Filed July 3, 1933   5 Sheets-Sheet 4

INVENTOR.
ROBERT EDWIN SPURR.
BY
ATTORNEYS.

May 28, 1935. R. E. SPURR 2,002,967
GRINDING APPARATUS
Filed July 3, 1933 5 Sheets-Sheet 5

INVENTOR.
ROBERT EDWIN SPURR.
BY
ATTORNEYS.

Patented May 28, 1935

2,002,967

UNITED STATES PATENT OFFICE 2,002,967

GRINDING APPARATUS

Robert Edwin Spurr, Detroit, Mich., assignor to Chrysler Corporation, Detroit, Mich., a corporation of Delaware Application July 3, 1933, Serial No. 678,914

13 Claims. (Cl. 51—95)

This invention relates to grinding apparatus.

One of the objects of the invention is to provide grinding apparatus, especially adapted for grinding spiral teeth on the periphery of cylindrical bodies or articles, of practical and flexible construction and of extended range of application and use.

Another object is to provide apparatus of the above character for effectively and efficiently controlling the relation of the body or article to be operated upon with respect to the operative tool or tools and insuring the proper and desired action of the tool on the body or article.

Another object is to rotate and simultaneously reciprocate a work piece while it is in contact with a grinding tool and to rotate the work piece in a step-by-step manner at a limit of its reciprocation to enable the tool to successively grind the teeth of the work piece to the desired form.

Another object is to effectively maintain contact between a master cam and a stationary element so as to form teeth on a work piece having the desired shape.

Other objects, features and advantages will become apparent from the following description and appended claims.

For the purpose of illustrating the genus of the invention, a typical concrete embodiment is shown in the accompanying drawings, wherein.

Figure 1:
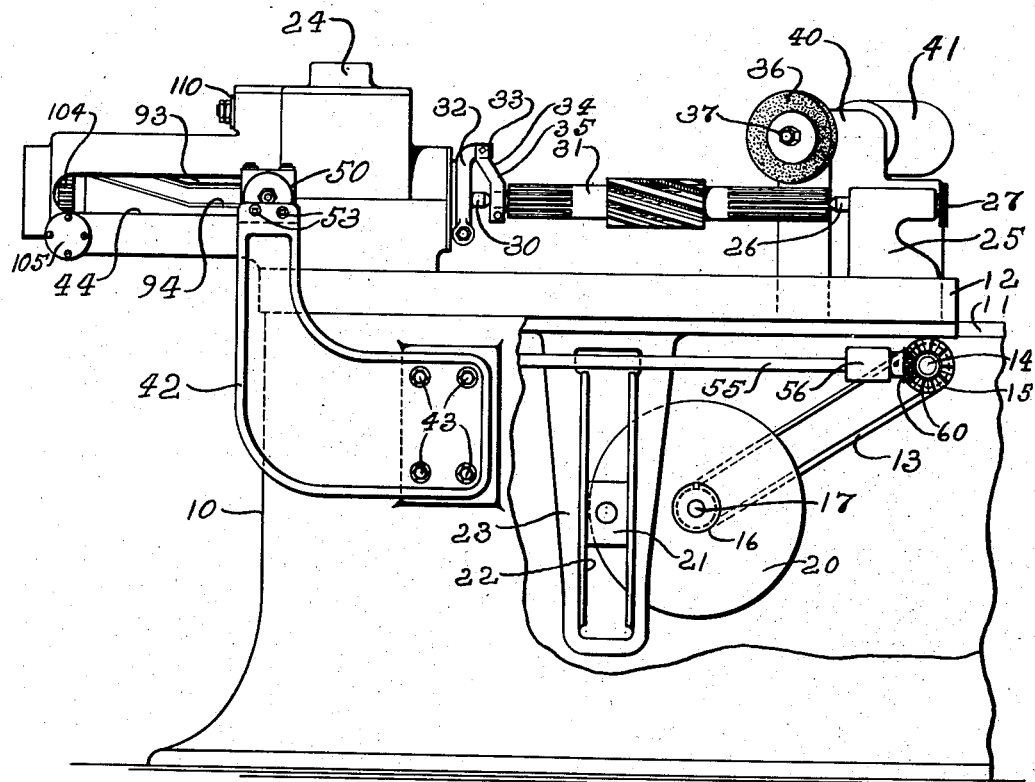
Figure 1 is a side elevation of a grinding machine constructed in accordance with this invention.
Figure 2:
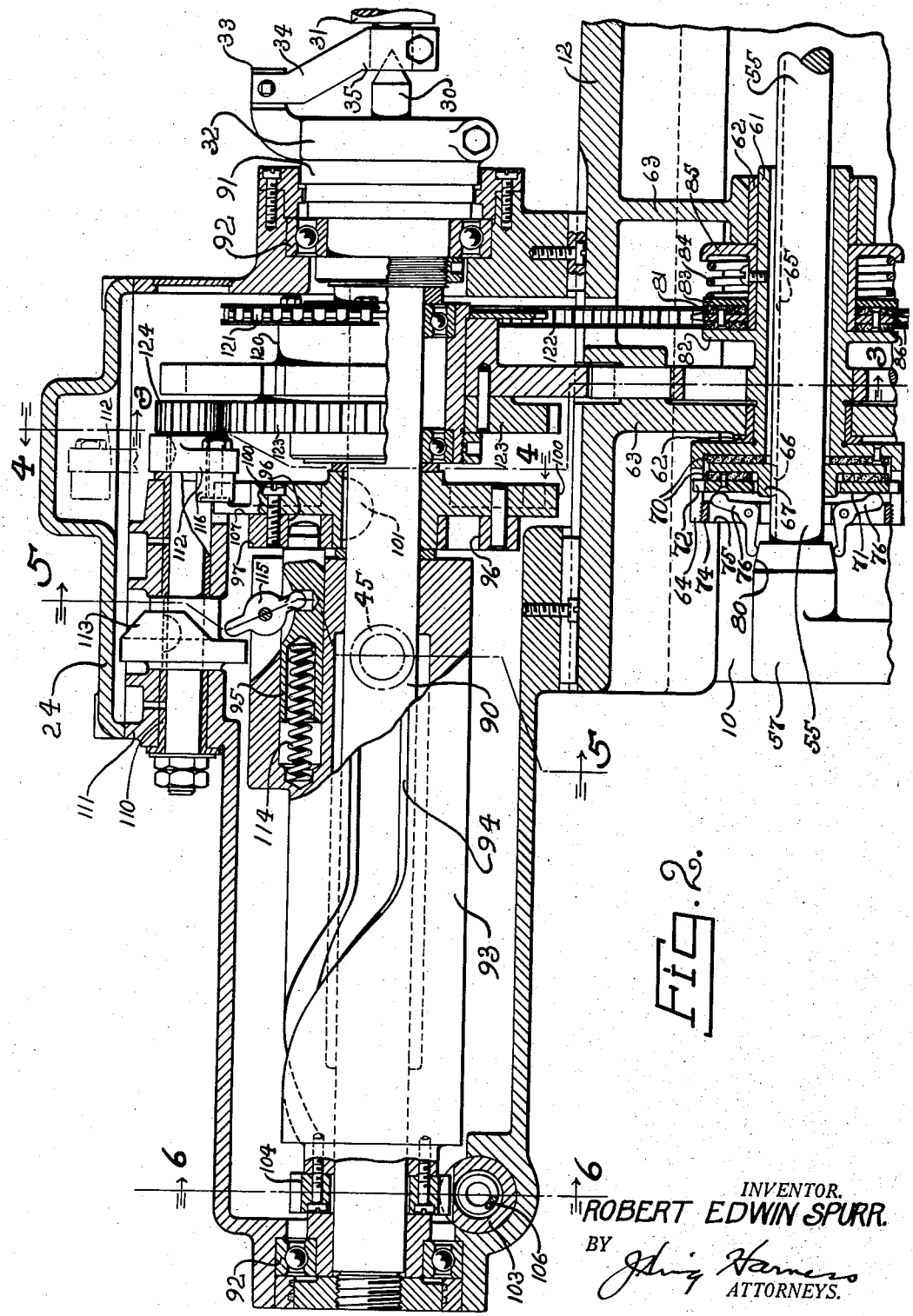
Fig. 2 is an enlarged central longitudinal section, with parts shown in elevation, of the work rotating and indexing head mechanism of the grinding machine shown in Fig. 1.
Figure 7:
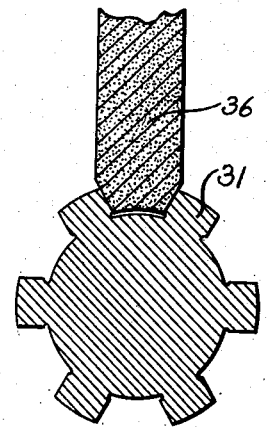

Figs. 3, 4, 5 and 6 are enlarged sections taken on the lines 3—3, 4—4, 5—5 and 6—6 of Fig. 2;

Fig. 7 is an enlarged section taken transversely through the work piece and finishing tool shown in Fig. 1, these elements being shown in engaged relation.

Figure 3:
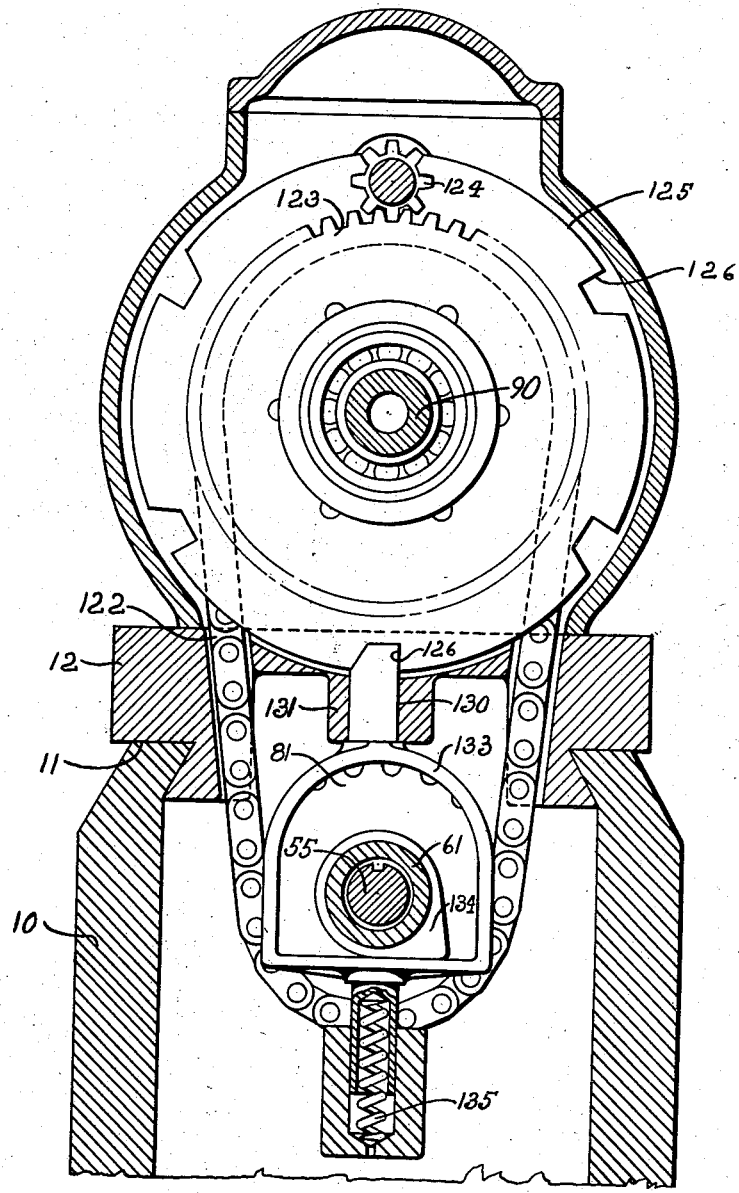

Referring to the drawings, and more especially to Figs. 1 and 3, there is shown a main or supporting frame 10 of any suitable construction provided with slideways 11 at the upper portion thereof upon which a carriage or table 12 is adapted to reciprocate, preferably longitudinally of the supporting frame. A driving shaft 14 is suitably journaled on the frame and connected to any available source of power, not shown, so as to be operated thereby. The shaft 14 is connected to the reciprocating table for operating the latter in any convenient manner, as for example, by a belt 13 extending between a pulley 15 secured to the shaft 14 and a pulley 16 secured to a shaft 17 journaled on the frame 10. The shaft 17 has secured thereto a disc 20 which has rotatably mounted thereon adjacent its periphery a rotatable slide block 21 adapted to reciprocate in a guideway 22 formed in a depending yoke member 23 fixed to the table 12. Rotation of the disc 20 by drive shaft 14 reciprocates the table 12 longitudinally of the supporting frame 10. A head stock 24 and a tail stock 25 are mounted adjacent the ends of the table or carriage 12. The head stock 24 is preferably fixed in position relative to the table 12 but the tail stock 25 may be adjustably fixed to the table so as to be adjusted toward and away from the head stock 24. The tail stock 25 has slidably mounted therein a dead center 26 adjustable longitudinally of the tail stock by a screw 27 for the purpose of making minor adjustments of the dead center 26 toward and away from the head stock. A live center 30 is mounted in a rotatable part journaled in the head stock 24, later to be described in detail. Upon the end of this rotatable part, disposed toward the tail stock, is secured a face plate 32 in the form of a slit clamp and provided with an outwardly extending arm 33 pivotally connected to an arm 34 of another split clamp 35 adapted to be secured to a piece of work 31 of round section. The work piece 31 is mounted on the centers 26 and 30 and is connected by means of a clamp 35 and face plate 32 to the above mentioned rotatable part journaled in the head stock 24.

A grinding wheel 36 is arranged in operative relation with respect to the work piece 31 so as to engage the work piece upon reciprocation of the table 12. The grinding wheel 36 is mounted upon a shaft 37 journaled in a standard 40 adjustably secured to the frame 10. The grinding wheel 36 is disposed at an angle with respect to the axis of the work piece 31 and the standard 40 is preferably adjustably secured to the frame 10 so that the angle of the plane of the grinding wheel with respect to the axis of the work piece may be varied as desired. The grinding wheel 36 is adapted to be operated through shaft 37 by means of a motor 41, or other suitable drive means.

Figure 5:
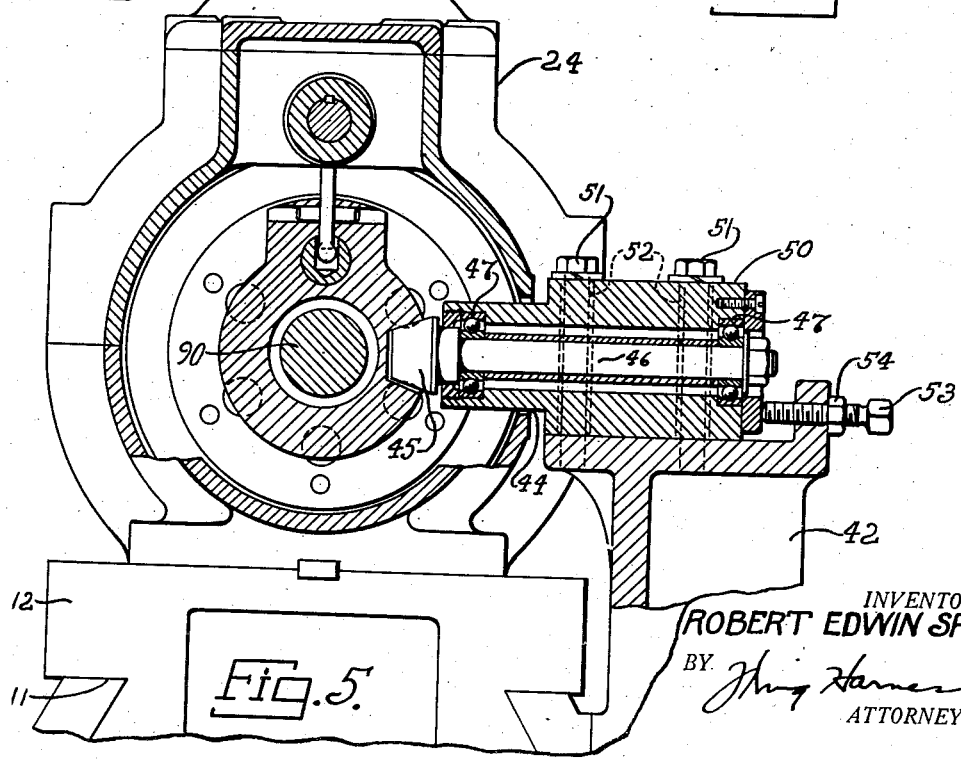
Figure 6:
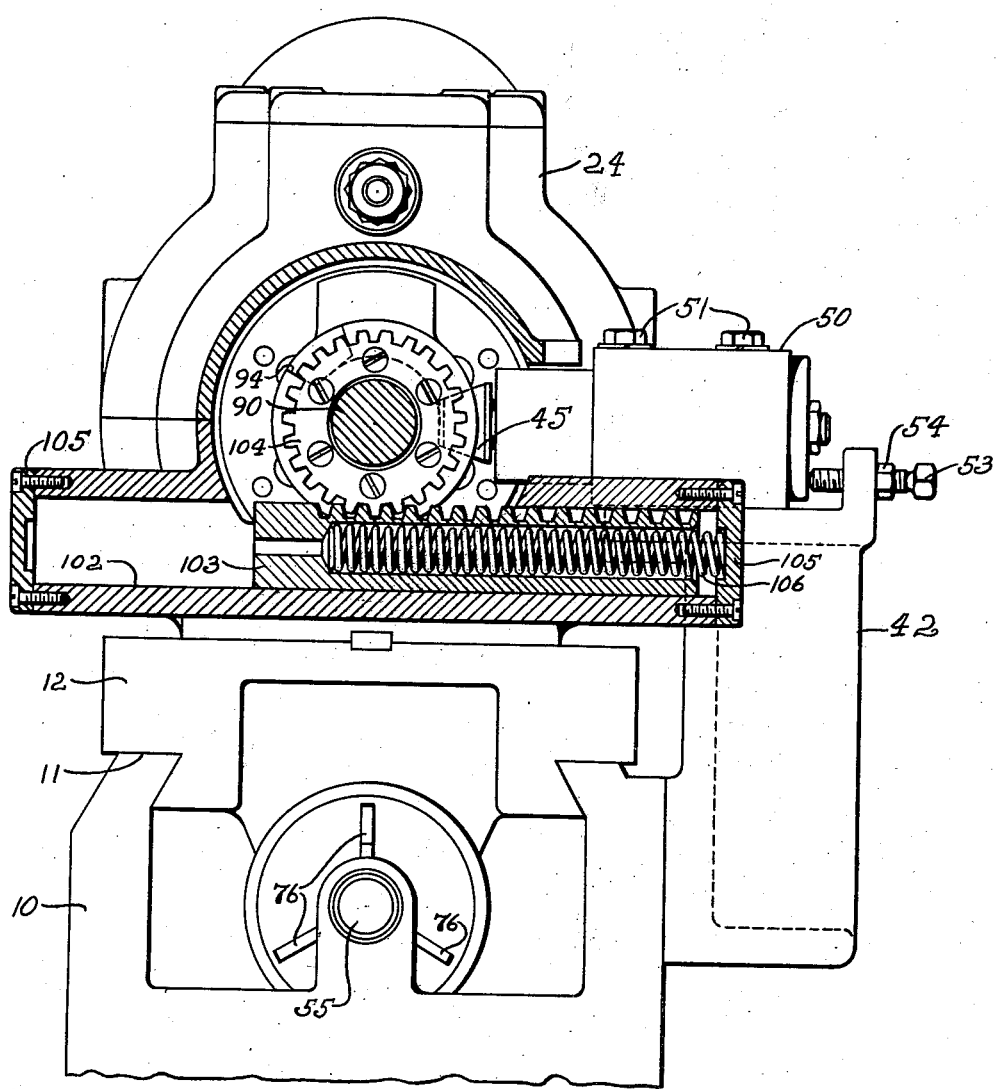

Referring to Figs. 1 and 6, a standard 42 is secured to the frame 10 by bolts 43 and serves as a mounting for a stud which projects through an opening 44 in the casing of the head stock 24 so as to cooperate with a part contained therein. Referring also to Fig. 5, it will be noted that this stud is in the form of a spindle shaft 46 provided with tapered roller 45 at the inner end thereof. The spindle shaft 46 is mounted in suitable bearings 47 disposed in a bearing block 50 secured to the standard 42 by means of the bolts 51. Enlarged openings 52 are provided in the bearing block 50 for the reception of the bolts 51 so that the bearing block may be adjusted inwardly or outwardly with respect to the slot 44 and elements contained within the head stock. After loosening the bolts 51 to release the clamping engagement between the bearing block 50 and the standard 42, the bearing block 50 may be adjusted by means of screws 53 threaded through a portion of the standard 42 and the adjusting screws 53 locked in position by means of nuts 54.

Referring to Figs. 1, 2, 3 and 6, a shaft 55 is journaled in suitable bearings 56 and 57 secured to the frame 10 and operatively connected to the drive shaft 14 by a pair of bevel gears 60 so as to be driven by the latter.

Referring more especially to Fig. 2, a sleeve 61 is journaled in bearings 62 provided in depending portions 63 of the table 12, the sleeve 61 surrounding but spaced from the shaft 55. One end of the sleeve 61, the left hand end as viewed in Fig. 2, is provided with an enlargement 64 adapted to provide a housing for a clutch mechanism for connecting the sleeve 61 and the shaft 55. The shaft 55 is provided with a key slot 65 extending through a major portion of its length and adapted to receive a key 66 of a clutch plate 67 mounted upon the shaft 55. The clutch plate 67 is freely slidable longitudinally of the shaft 55 but connected for even rotation therewith by means of the key 66 and key slot 65. The inner face of the clutch housing 64 has a disc 70 of friction material secured thereto at one side of the clutch plate 67 and upon which one face of the clutch plate is adapted to bear when a clutch disc 71 is forced inwardly with respect to the housing. The clutch disc 71 is secured against relative rotation to the clutch housing 64 by means of fingers 72 and is provided with a disc 70 of friction material adapted to bear against the second face of the friction plate 67. The clutch housing 64 is closed by means of an end plate 74 threaded thereto and slotted as indicated at 75 to receive bell crank arms 76 adapted to operate the clutch means disposed within the housing. One end of each of the bell crank arms 76 is adapted to engage a bevel shoulder 80 formed on the bearing 57 for the shaft 55 and the other end of each of the bell crank arms 76 is adapted to engage the clutch disc 71 to force the same inwardly so as to compress the friction discs 70 against the clutch plate 67. Movement of the carriage or table 12 to the left as viewed in Fig. 2 will bring the bell crank arms 76 into engagement with the beveled shoulder 80 of the bearing 57 so as to cause engagement of the clutch and consequently connect the sleeve 61 to the shaft 55 for rotation therewith.

A sprocket wheel 81 is journaled on the sleeve 61 between a fixed shoulder 82 formed on the sleeve and a movable clutch disc 83 biased against the sprocket wheel 81 by means of a spring 84 interposed between the movable clutch disc and a flange 85 fixed to the sleeve 61. The sides of the sprocket wheel 81 are faced with friction material in the form of discs 86. The spring 84 normally biases the clutch disc 83 against the sprocket wheel wheel 81 to cause rotation of the sprocket wheel with the sleeve 61, but will yield to allow rotation of the sleeve 61 relative to the sprocket 81 when the sprocket wheel or elements driven thereby are checked from rotating.

The rotatable element, previously referred to, to which the face plate 32 is adapted to be clamped, is in the form of a shaft 90 having an enlarged end 91 and journaled in the head stock 24 by means of suitable bearings 92. A cam sleeve 93 is journaled on the shaft 90 and is provided with a cam groove 94 formed in the periphery thereof. The cam groove 94 is directed parallel to the axis of the shaft 90 at the right hand end portion of the cam sleeve 93 and the left hand portion of the cam groove 94 may be directed at an angle to the axis of the shaft 90, the angle corresponding to the angle which the teeth of the work piece 31 form with respect to its axis. The tapered roller 45 fixed to the end of the spindle shaft 46 cooperates with the cam groove 94 to cause the sleeve 93 to travel to the right without rotation and then to rotate as the work piece 31 comes into engagement with the grinding tool 36 upon reciprocation of the table 12 to the right, as viewed in Figs. 1 and 2. At this time the cam sleeve 93 is locked to the shaft 90 by means of a lock member 95 slidably received within a portion near the periphery of the cam sleeve so as to cooperate with openings 96 provided in a disc 97 non-rotatably secured relative to the shaft 90. The number of openings 96 in the disc 97 corresponds to the number of teeth to be formed on the work piece 31. The disc 97 may be rigidly secured to or form an integral part of a disc 100 keyed to the shaft 90 by means of a key 101.

Figure 4:
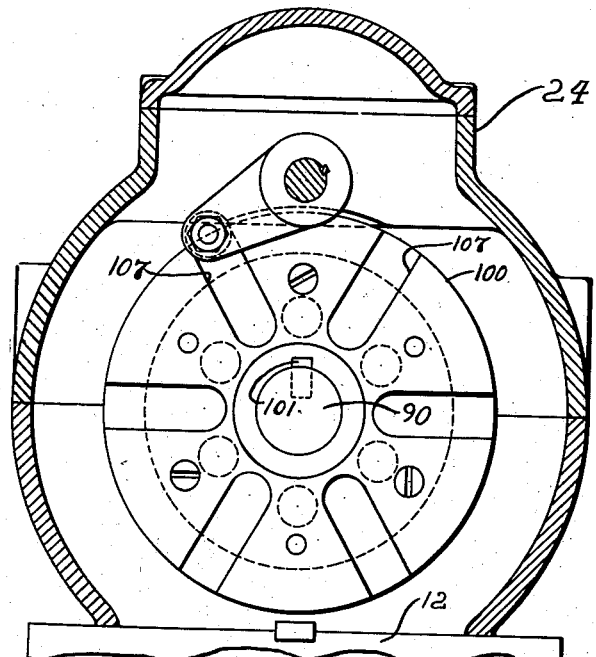

Referring to Figs. 2 and 6, a transverse slideway 102 is provided in the head stock 24 for the reception of a rack 103 which is adapted to cooperate with a pinion 104 fixed to the cam sleeve 93. End plates 105 are secured to the housing of the head stock 24 at the end of the slideway 102 and form abutments for a spring 106 disposed within the rack and interposed between the rack and an end plate to constantly bias the rack 103 in one direction so as to maintain one wall of the cam groove 94 constantly in contact with the tapered roller 45. It will be noted that the rack 103 and spring 106 may be reversed in position in the slideway 102 so as to bias the pinion gear 104 in the opposite direction to bring the opposite wall of the cam groove 94 into contact with the tapered roller 45. It is also noted that, as shown in Fig. 6, additional cam grooves 94 may be provided in the cam sleeve 93 which may be employed after one of the cam grooves has worn to such an extent as to inaccurately form the teeth on the work piece. It is further noted that the additional cam grooves 94 may be of different shape when it is desired to form teeth of a different character on the work piece. The disc 100 which is keyed to the shaft 90 may be in the form of a Geneva wheel provided with radially disposed slots 107 as illustrated in Figs. 2 and 4. The number of slots 107 formed in the disc 100 will correspond to the number of teeth that are to be ground on the work piece 31. The disc 100 is provided with the slots 107 so as to operate the shaft 90 and the work piece independently of the cam sleeve 93 at a limit of the reciprocation of the table 12. To this end a counter-shaft 110 is journaled in suitable bearings 111 at the upper portion of the head stock 24 and the counter-shaft is provided with a cam means 113 for effecting the withdrawal of the locking means 95 from engagement with the openings 96 in the disc 97 secured to the disc 100, and is further provided with an operating arm 112 adapted to cooperate with the slots 107 for operating the disc 100 independently of the cam sleeve 93. The lock member 95 is normally biased into engagement with an opening 96 by means of a spring 114 but may be withdrawn from such engagement by a lever 115 pivoted to the sleeve 93 and engageable with the cam 113 at one end and with the lock member 95 at its opposite end. The operating arm 112 is provided with a roller 116 adapted to cooperate with the slots 107 of the disc or Geneva wheel 100. The cam 113 is shaped to withdraw the lock member 94 from an opening 96 just prior to the engagement of roller 116 of arm 12 with a radial slot 107 provided in the disc 100.

The counter-shaft 110 is operated by a drive sleeve 120 journaled on the shaft 90 between the disc or Geneva wheel 100 and the enlarged end 91 of shaft 90. The sleeve 120 is provided with a sprocket 121 fixed thereto and which is connected by means of a sprocket chain 122 to the sprocket 81 journaled on the clutch sleeve 61. The drive sleeve 120 is provided with a gear 123 either integral therewith or fixed thereto and adapted to cooperate with a gear 124 fixed to the counter-shaft 110. The ratio of the diameters of the gears 123 and 124 is numerically equal to the number of teeth that it is desired to grind on the work piece 31 and to the number of slots 107 provided in the disc or Geneva wheel 100. In the embodiment illustrated, the diameter of gear 123 is six times that of the diameter of gear 124.

Referring to Figs. 2 and 3, the drive sleeve 120 is provided with a stop disc 125 disposed intermediate the gear 123 and sprocket 121. The disc 125 is provided with a number of notches 126, a number of these notches corresponding with the number of teeth to be ground on the work piece. A stop member 130 is slidably mounted in suitable bearings 131 and is provided intermediate its length with a stirrup-like member 133 adapted to cooperate with a cam 134 mounted on the clutch sleeve 61 and fixed for rotation therewith. The stop member 130 is normally biased in engagement with the notches 126 of the stop disc 125 by means of a spring 135. One face of the stop member 130 and one face of each of the notches 126 are arranged essentially radially of the disc 125 while the other face of the stop member 130 and the other faces of the notches 126 are beveled as indicated in Fig. 3 so that the stop member will prevent clockwise rotation of the stop disc 125 but will permit counter-clockwise rotation of the stop disc relative to the stop 130.

In the operation of the grinding device a work piece 31 of round section, preferably in the form of a spline provided with roughly formed teeth, is mounted on the centers 26 and 30. The groove between two adjacent teeth may be approximately aligned with the grinding tool 36 before clamping the face plate 32 or the clamp 35 relative to the shaft 90 or to the work piece 31. The groove between two adjacent teeth of the work piece may be more accurately aligned with respect to the grinding tool by adjustment of the tapered roller 45 inwardly or outwardly with respect to a beveled contact wall of the groove 93.

With the paths of the grinding device in the positions shown in Fig. 1, the shaft 14, rotating in a clockwise direction, will cause rotation of the disc 20 in the same direction. The shaft 55 will be rotated in a clockwise direction as viewed from the left or head end of the grinding device illustrated in Fig. 1. At this time the slide block 21 has moved the table or carriage 12 nearly to its extreme position to the left as viewed in Figs. 1 and 2 and has caused the fingers 76 of the clutch mechanism housed in the enlarged portion 64 of sleeve 61 to engage the beveled shoulder 80 of the bearing 57. This causes the clutch mechanism housed in the enlargement 64 to bring the sleeve 61 and shaft 55 into operative relation and to rotate the sleeve 61 in a clockwise direction as viewed from the left hand end of the shaft 55. Rotation of the sleeve 61 in this direction as illustrated in Fig. 3 causes the cam 134 to effect the release of the stop member 130 from engagement with the notch 126 in the stop disc 125 and allows the drive sleeve 120 to be rotated through the sprockets 81 and 121 and sprocket chain 122. The yieldable clutch mechanism for the sprocket 81 at this time will cause the rotation of this sprocket with the sleeve 61. The sleeve 61 will continue to rotate in a clockwise direction as viewed in Fig. 3 until the side block 21 has moved the table 12 to the right and released the bell crank arms 76 from engagement with the beveled shoulder 80 and disconnected the sleeve 61 from the shaft 55. The sleeve 61 is disconnected from the shaft 55 at approximately the same time that the cam 134 reassumes the position shown in Fig. 3.

The sleeve 120 will be rotated in a clockwise direction until the stop disc 125 has brought the next notch 126 into engagement with the stop 130 and thereafter the yieldable clutch for the sprocket 81 will permit rotation of the sleeve 61 without causing further rotation of the drive sleeve 120. The sleeve 120 thus has been rotated through an angle corresponding to the angle between adjacent grooves of the work piece 31. In the embodiment illustrated this angle is 60 degrees. Rotation of the sleeve 120 through one-sixth of a revolution will rotate the gear 124 through a complete revolution in a counter-clockwise direction as viewed from the head or left hand end of the head stock illustrated in Fig. 2, but in a clockwise direction as viewed in Fig. 4. The gear 124 will rotate the arm 112 in a clockwise direction as viewed in Fig. 4 until the roller thereon is nearly in position to register with the next adjacent slot 107 at which time the cam 113 will have rotated the lever 115 in a clockwise direction, as viewed in Fig. 2, and withdrawn the stop member 95 from engagement with an opening 96 in the disc 97 secured to the Geneva wheel 100 fixed to the shaft 90. This releases the connection between the sleeve 93 and the shaft 90. Continued rotation of the counter shaft 110 causes the roller on arm 112 to engage the next adjacent slot 107 and to rotate the Geneva wheel 100 through an angle corresponding to that between adjacent grooves on the work piece 31, the angle being 60 degrees in the embodiment illustrated. During the rotation of the Geneva wheel 100 and the shaft 90, together with the work piece 31, the sleeve 93 has been restrained from rotation by the roller 45 so that the shaft 90 has been rotated relative to the sleeve 93 through an angle corresponding to that between adjacent grooves on the work piece. After the Geneva wheel 100 has been rotated through this fraction of a revolution the lock member 95 will again engage an opening 96 in the disc 97 fixed to the Geneva wheel 100, thus locking the sleeve 93 relative to the Geneva wheel, the shaft 90 and the work piece 31.

After the clutch mechanism housed in the enlargement 64 of the sleeve 61 has been separated from the beveled shoulder 80, the indexing mechanism will be inactive until this clutch mechanism has been re-engaged. With the sleeve 61 disengaged from the shaft 55 the drive shaft 14 serves only to rotate the disc 20 and through the slide block 21 causes reciprocation of the table 12. During the reciprocation of the table 12, except at the limit indicated, the shaft 90 and the cam sleeve 93 are interlocked so that rotation or non-rotation of the work piece 31 is directly under the control of the cam sleeve and movement of the work piece will be controlled by the cam groove 94 and roller 45. The reciprocation of the table 12 will bring the work piece into contact with the grinding wheel 36 and as the table is moved to the right, as viewed in Fig. 1, the cam groove 94 will cause rotation of the work piece to grind the teeth thereon to the desired form. As the table 12 is moved from its extreme position to the right back to its left hand position the grinding tool 36 will continue in the same groove of the work until the work piece has cleared the grinding tool and when the table has been moved to its extreme left hand position the shaft 90 and the work piece will be rotated relative to the cam sleeve 93 and these parts again interlocked so as to cut the next adjacent groove between adjacent teeth of the work piece.

As many changes could be made in the above construction and many apparently different embodiments of this invention could be made without departing from the scope thereof, it is intended that all matter contained in the above description or shown in the accompanying drawings shall be interpreted as illustrative and not in a limiting sense.

I claim:

1. In a grinding machine, a frame, a table mounted for reciprocation on said frame, a drive shaft journaled on said frame, means operable by said drive shaft for reciprocating said table, a grinding tool journaled on said frame, means for rotating said tool, work holding means for journaling a piece of work relative to said frame and in operative relation with respect to said grinding tool, said work holding means including a shaft journaled on said table, means for connecting said second shaft to the work piece for even rotation therewith, a sleeve journaled on said second shaft and provided with a cam surface, a stud fixed relative to said frame and engaging said cam surface for causing rotation of the sleeve upon reciprocation of the table, a member fixed to said second shaft and provided with openings therein, a lock member carried by said sleeve and cooperable with the openings in said last-named member for locking the latter relative to the sleeve, and means operable by said drive shaft for withdrawing said lock member from an opening in the member fixed to said second-named shaft and for causing rotation of said second shaft and the work piece independently of said sleeve at a limit of the reciprocation of said table.

2. In a grinding machine, a frame, a table mounted for reciprocation on said frame, a drive shaft journaled on said frame, means operable by said drive shaft for reciprocating said table, a grinding tool journaled on said frame, means for rotating said tool, work holding means for journaling a piece of work relative to said frame and in operative relation with respect to said grinding tool, said work holding means including a shaft journaled on said table, means for connecting said second shaft to the work piece for even rotation therewith, a sleeve journaled on said second shaft and provided with a cam surface, a stud fixed relative to said frame and engaging said cam surface for causing rotation of the sleeve upon reciprocation of the table, a second sleeve member journaled on said second shaft, releasable stop means carried by said table and engageable with said second sleeve for preventing rotation in one direction of the latter relative to the table, means operable by said drive shaft for releasing said stop means from engagement with said second sleeve at a limit of the reciprocation of the table, means for releasably connecting said second shaft to said first-named sleeve, means operable by said drive shaft at said one limit of reciprocation of the table for rotating said second sleeve member, and means operable by said second sleeve member for releasing the connection between the second shaft and the first named sleeve for causing rotation of said second shaft and the work piece independently of said first-named sleeve at said one limit of the reciprocation of the table.

3. In a grinding machine, a frame, a table mounted for reciprocation on said frame, a drive shaft journaled on said frame, means operable by said drive shaft for reciprocating said table, a grinding tool journaled on said frame, means for rotating said grinding tool, work holding means for journaling a piece of work relative to said frame and in operative relation with respect to said grinding tool, said work holding means including a work rotating shaft journaled on said table, means for connecting said work rotating shaft to the work piece for even rotation therewith, a cam sleeve journaled on said work rotating shaft and provided with a cam groove, a stud fixed relative to said frame and disposed in said cam groove for causing rotation of the cam sleeve upon reciprocation of the table, a disc fixed to said work rotating shaft and provided with openings therein, a lock member carried by said cam sleeve and cooperating with the openings in said disc for locking the disc and cam sleeve against relative rotation, and clutch means journaled in said table and operable by said drive shaft at a limit of the reciprocation of said table for withdrawing said lock member from the openings in said disc and for causing rotation of said work rotating shaft and the work piece independently of the cam sleeve.

4. In a grinding machine, a frame, a table mounted for reciprocation on said frame, means for reciprocating the table, a grinding tool journaled on said frame, means for rotating said grinding tool, work holding means for journaling a piece of work of round section relative to said frame and in operative relation with respect to said grinding tool, said work holding means including a work rotating shaft journaled on said frame, means for connecting said work rotating shaft to the work piece for even rotation therewith, a cam sleeve journaled on said work rotating shaft and provided with a cam groove, a stud fixed relative to said frame and disposed in said cam groove for causing rotation of said cam sleeve upon reciprocation of the table, a Geneva wheel fixed on said work rotating shaft and provided with openings and radially disposed slots therein, a lock member carried by said cam sleeve and cooperating with the openings in said wheel for locking the wheel and cam sleeve against relative rotation, a drive sleeve journaled on said work rotating shaft, means for rotating said drive sleeve at one limit of the reciprocation of said table, and means operable by said drive sleeve for disengaging said lock member from the Geneva wheel and for rotating the Geneva wheel and the work rotating shaft independently of said cam sleeve.

5. In a grinding machine, a frame, a table mounted for reciprocation on said frame, means for reciprocating the table, a grinding tool journaled on said frame, means for operating said grinding tool, work holding means for journaling a piece of work of round section relative to said frame and in operative relation with respect to said grinding tool, said work holding means including a work rotating shaft journaled on said table, means for connecting said work rotating shaft to the work piece for even rotation therewith, a cam sleeve journaled on said work rotating shaft and provided with a cam groove, a stud fixed relative to said frame and disposed in said cam groove for causing rotation of said cam sleeve upon reciprocation of the table, a Geneva wheel fixed on said work rotating shaft and provided with openings and radially disposed slots therein, a lock member carried by said cam sleeve and cooperating with the openings in said wheel for locking the wheel and cam sleeve against relative rotation, a drive sleeve journaled on said work rotating shaft, means for rotating said drive sleeve at one limit of the reciprocation of said table, a gear fixed to said drive sleeve, a counter shaft journaled on said table, a gear fixed to said counter shaft and engageable with the gear on said drive sleeve, and means operable by said counter shaft for disengaging said lock member from said Geneva wheel and for rotating the Geneva wheel and the work rotating shaft independently of said cam sleeve.

6. In a grinding machine, a frame, a table mounted for reciprocation on said frame, means for reciprocating the table, a grinding tool journaled on said frame, means for operating said grinding tool, work holding means for journaling a piece of work of round section relative to said frame and in operative relation with respect to said grinding tool, said work holding means including a work rotating shaft journaled on said table, means for connecting said work rotating shaft to the work piece for even rotation therewith, a cam sleeve journaled on said work rotating shaft and provided with a cam groove, a stud fixed relative to said frame and disposed in said cam groove for causing rotation of said cam sleeve upon reciprocation of the table, a Geneva wheel fixed on said work rotating shaft and provided with openings and radially disposed slots therein, a lock member carried by said cam sleeve and cooperating with the openings in said wheel for locking the wheel and cam sleeve against relative rotation, a drive sleeve journaled on said work rotating shaft, means for rotating said drive sleeve at one limit of the reciprocation of said table, means operable by said drive sleeve for disengaging said lock member from the Geneva wheel and for rotating the Geneva wheel and the work rotating shaft independently of said sleeve, and means for preventing rotation in one direction of the drive sleeve during reciprocation of the table.

7. In a grinding machine, a frame, a table mounted for reciprocation on said frame, means for reciprocating the table, a grinding tool journaled on said frame, means for rotating said grinding tool, work holding means for journaling a piece of work of round section relative to said frame and in operative relation with respect to said grinding tool, said work holding means including a work rotating shaft journaled on said table, means for connecting said work rotating shaft to the work piece for even rotation therewith, a cam sleeve journaled on said work rotating shaft and provided with a cam groove, a stud fixed relative to said frame and disposed in said cam groove for causing rotation of said cam sleeve upon reciprocation of the table, a Geneva wheel fixed on said work rotating shaft and provided with openings and radially disposed slots therein, a locking member carried by said cam sleeve and cooperating with the openings in said wheel for locking the wheel and cam sleeve against relative rotation, a drive sleeve journaled on said work rotating shaft, means for rotating said drive sleeve at one limit of the reciprocation of said table, a gear fixed to said drive sleeve, a counter shaft journaled on said table, a gear fixed to said counter shaft and engageable with the gear on said drive sleeve, means operable by said counter shaft for disengaging said lock member from said Geneva wheel and for rotating the Geneva wheel and the work rotating shaft independently of said cam sleeve, and means for preventing rotation in one direction of the drive sleeve during reciprocation of the table.

8. In a grinding machine, the combination with a frame, a table mounted for reciprocation on said frame and means for reciprocating said table, of a work rotating and indexing mechanism comprising work holding means including a work rotating shaft, a cam sleeve journaled on said shaft and provided with a cam groove, means fixed to said frame and disposed in said cam groove for causing rotation of the cam sleeve during reciprocation of the table, a lock member on said cam sleeve for locking the latter to said shaft, a drive sleeve journaled on said work rotating shaft, means for rotating the drive sleeve at one limit of the reciprocation of said table, and means operable by said drive sleeve for unlocking said cam sleeve from said shaft at a limit of the reciprocation of the table and for rotating the shaft independently of the cam sleeve.

9. In a grinding machine, the combination with a frame, a table mounted for reciprocation on said frame and means for reciprocating said table, of a work rotating and indexing mechanism comprising work holding means including a work rotating shaft, a cam sleeve journaled on said shaft and provided with a cam groove, means fixed to said frame and disposed in said cam groove for causing rotation of the cam sleeve during reciprocation of the table, a lock member on said cam sleeve for locking the latter to said shaft, a drive sleeve journaled on said work rotating shaft, a gear fixed to said drive sleeve, a counter shaft journaled on said table, a gear fixed to said counter shaft and engageable with the gear on said drive sleeve, and means operable by said counter shaft for unlocking said cam sleeve from said shaft at a limit of the reciprocation of the table and for rotating the shaft independently of the cam sleeve.

10. In a grinding machine, the combination with a frame, a table mounted for reciprocation on said frame and means for reciprocating said table, of a work rotating and indexing mechanism comprising work holding means including a work rotating shaft, a cam sleeve journaled on said shaft and provided with a cam groove, means fixed to said frame and disposed in said cam groove for causing rotation of the cam sleeve during reciprocation of the table, a lock member on said cam sleeve for locking the latter to said shaft, a drive sleeve journaled on said work rotating shaft, a gear fixed to said drive sleeve, a counter shaft journaled on said table, a gear fixed to said counter shaft and engageable with the gear on said drive sleeve, means operable by said counter shaft for disengaging the cam sleeve from said work rotating shaft at a limit of the reciprocation of the table and for rotating the shaft independently of the cam sleeve, and means for preventing rotation in one direction of the drive sleeve during reciprocation of the table.

11. In a grinding machine, the combination with a frame, a table mounted for reciprocation on said frame and means for reciprocating said table, of a work rotating and indexing mechanism comprising work holding means including a work rotating shaft, a cam sleeve journaled on said shaft and provided with a cam groove, means fixed to said frame and disposed in said cam groove for causing rotation of the cam sleeve during reciprocation of the table, a lock member on said cam sleeve for locking the latter to said shaft, a drive sleeve journaled on said work rotating shaft, means including a clutch for rotating said drive sleeve at one limit of the reciprocation of said table, and means operable by said drive sleeve for unlocking said cam sleeve from said shaft at a limit of the reciprocation of the table and for rotating the shaft independently of the cam sleeve.

12. In a grinding machine, the combination with a frame, a table mounted for reciprocation on said frame and means for reciprocating said table, of a work rotating and indexing mechanism comprising work holding means including a work rotating shaft, a cam sleeve journaled on said shaft and provided with a cam groove, means fixed to said frame and disposed in said cam groove for causing rotation of the cam sleeve during reciprocation of the table, a lock member on said cam sleeve for locking the latter to said shaft, a drive sleeve journaled on said work rotating shaft, means including a clutch for rotating said drive sleeve at one limit of the reciprocation of said table, means for preventing rotation in one direction of the drive sleeve during reciprocation of the table, means operable by said clutch for disconnecting said last named means from the drive sleeve at said one limit of the reciprocation of said table, and means operable by said drive sleeve for unlocking said cam sleeve from said shaft at said one limit of the reciprocation of the table and for rotating the shaft independently of the cam sleeve.

13. In a grinding machine, the combination with a frame, a table mounted for reciprocation on said frame and means for reciprocating said table, of a work rotating and indexing mechanism comprising work holding means including a work rotating shaft, a cam sleeve journaled on said shaft and provided with a cam groove, stud means fixed to said frame and disposed in said cam groove for causing rotation of the cam sleeve during reciprocation of the table, a pinion fixed to said cam sleeve, a slideway provided in said table, a rack member reciprocably mounted in said slideway and engageable with said pinion for rotating the cam sleeve to maintain said stud member in engagement with one wall of said cam groove, and yieldable means for actuating said rack member.

ROBERT EDWIN SPURR.